(12) United States Patent
Kim (10) Patent No.: US 7,980,593 B2
(45) Date of Patent: Jul. 19, 2011

(54) AIRBAG MODULE HAVING A TETHER HOLDER

(75) Inventor: Jin Kook Kim, Kangwon-do (KR)

(73) Assignee: Autoliv Development AB, Vargarda (SE)

( * ) Notice: Subject to any disclaimer, the term of this patent is extended or adjusted under 35 U.S.C. 154(b) by 69 days.

(21) Appl. No.: 12/437,570

(22) Filed: May 8, 2009

(65) Prior Publication Data

US 2009/0278341 A1    Nov. 12, 2009

(30) Foreign Application Priority Data

May 9, 2008   (KR) .................. 10-2008-0043429

(51) Int. Cl.
B60R 21/23 (2006.01)
(52) U.S. Cl. .................................. 280/743.2; 280/739
(58) Field of Classification Search ............... 280/743.2, 280/739
See application file for complete search history.

(56) References Cited

U.S. PATENT DOCUMENTS

| 5,280,953 | A | * | 1/1994 | Wolanin et al. | 280/739 |
|---|---|---|---|---|---|
| 5,362,101 | A | * | 11/1994 | Sugiura et al. | 280/743.2 |
| 5,570,905 | A | * | 11/1996 | Dyer | 280/743.2 |
| 6,113,134 | A | | 9/2000 | Lim | |
| 6,254,130 | B1 | * | 7/2001 | Jayaraman et al. | 280/743.2 |
| 6,616,184 | B2 | * | 9/2003 | Fischer | 280/743.2 |
| 6,871,874 | B2 | * | 3/2005 | Husby et al. | 280/743.2 |
| 7,261,319 | B2 | * | 8/2007 | DePottey et al. | 280/739 |
| 7,475,906 | B2 | * | 1/2009 | Goto et al. | 280/743.2 |
| 7,497,469 | B2 | * | 3/2009 | Fischer et al. | 280/743.2 |
| 7,722,080 | B2 | * | 5/2010 | Rose et al. | 280/743.2 |
| 2002/0043791 | A1 | * | 4/2002 | Barnes | 280/743.1 |
| 2002/0146949 | A1 | * | 10/2002 | Keshavaraj | 442/76 |
| 2004/0113404 | A1 | * | 6/2004 | Ryan et al. | 280/735 |
| 2005/0023811 | A1 | * | 2/2005 | Thomas | 280/736 |
| 2006/0061076 | A1 | | 3/2006 | Webber et al. | |
| 2006/0170202 | A1 | * | 8/2006 | Block et al. | 280/743.2 |
| 2006/0226637 | A1 | * | 10/2006 | Ryan et al. | 280/728.1 |
| 2007/0052217 | A1 | * | 3/2007 | Miyata | 280/730.1 |
| 2007/0108750 | A1 | * | 5/2007 | Bauer et al. | 280/740 |
| 2007/0182144 | A1 | * | 8/2007 | Aranzulla et al. | 280/743.2 |

FOREIGN PATENT DOCUMENTS

DE         29521695       2/1995
WO    WO2007/046740     4/2007

* cited by examiner

*Primary Examiner* — Paul N. Dickson
*Assistant Examiner* — George D. Spisich
(74) *Attorney, Agent, or Firm* — Brinks Hofer Gilson & Lione (57) ABSTRACT

A passenger airbag module equipped with an airbag cushion and a tether holder used in a vehicle. The tether holder holds a tether prior to inflating the airbag cushion and inhibits twisting of the tether during deployment of the tether when the airbag cushion is inflated. When the tether is deployed without being twisted or folded, the deployment length of the tether is not reduced. Thus, the airbag is more consistently deployed and inflated.

10 Claims, 8 Drawing Sheets

AIRBAG MODULE HAVING A TETHER HOLDER

TECHNICAL FIELD OF INVENTION

The present invention relates to an airbag module comprising a cushion, a tether attached to the cushion, and a tether holder for controllably releasing the tether during deployment. More particularly, the present invention relates to such airbag module wherein the tether holder contains a section of the tether that is folded and progressively released to inhibit twisting during deployment.

BACKGROUND OF INVENTION

Generally, a vehicle is provided therein with seat belts, which restrain passengers as well as a driver for the sake of safety in crash, in order to attenuate deceleration exerted on a body of the passenger. The seat belt restrains the passengers during a collision. In addition to the seat belt, vehicles are provided with an airbag module rapidly inflating an airbag between a driver and a steering wheel or between a passenger in a passenger seat and an instrument panel in crash to attenuate the injury of the driver or the passenger caused by impact occurring in the crash.

Figure 1:
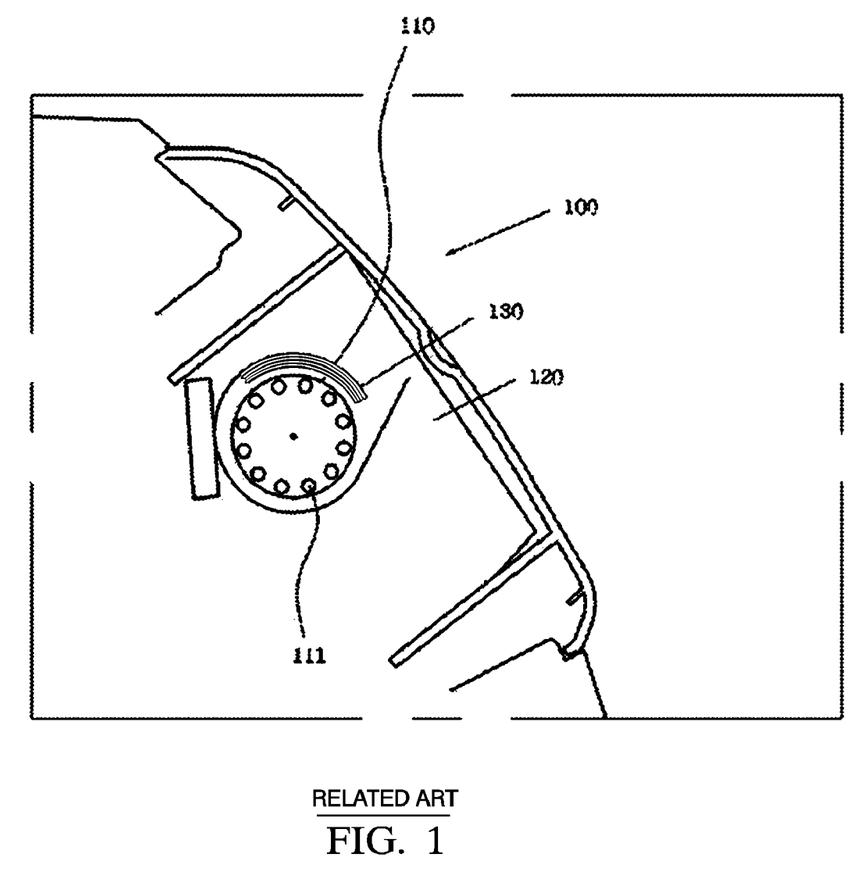
FIG. 1 is a perspective view schematically showing a passenger airbag module for a vehicle according to the related art.
Figure 2:
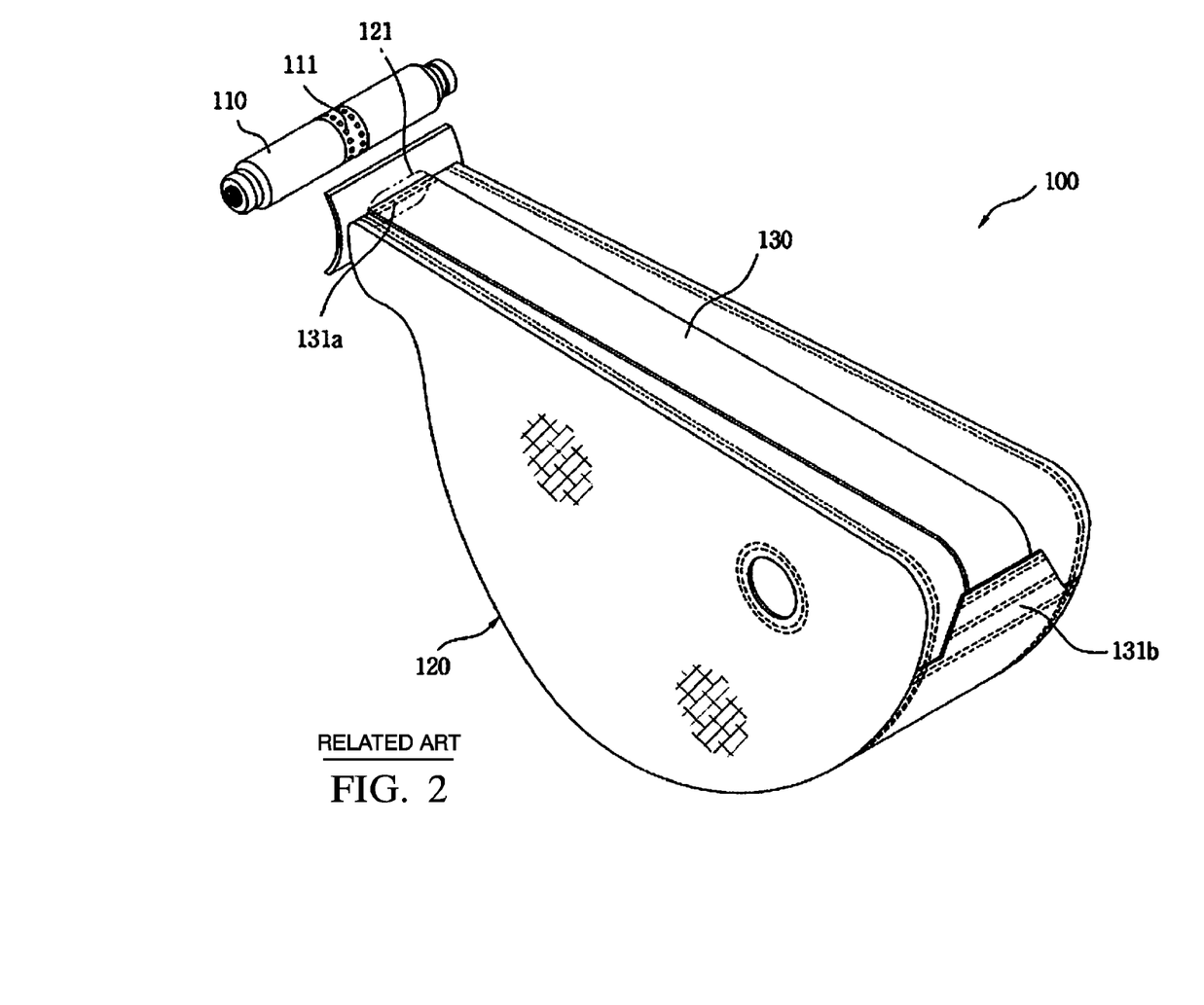
FIG. 2 is a perspective view schematically showing a deployment shape of a passenger airbag cushion for a vehicle according to the related art.

FIG. 1 is a sectional view schematically showing an airbag module according to the related art, and FIG. 2 is a perspective view schematically showing a deployment shape of a passenger airbag module for a vehicle according to the related art. As shown in FIGS. 1 and 2, a passenger airbag module 100 for a vehicle includes an inflator 110, an airbag cushion 120, and a tether 130. The inflator 110 generates nitrogen gas (N2) upon explosion of a detonator. The airbag cushion 120 expands or deploys through a deployment part by nitrogen gas generated from the inflator 110. The tether 130 connects a front part of the airbag cushion 120, which makes contact with the body of the passenger, with a rear part 131a of the airbag cushion 120, into which nitrogen gas is injected from the inflator 110. The inflator 110 of the airbag module 100 includes a gas generating agent generating the N2 as the detonator of the inflator 110 is ignited, and the tether 130 is deployed by the nitrogen gas in a state in which the tether 130 is wound around the inflator 110.

In order to control deployment length of the airbag cushion 120, the airbag module 100 includes a rear part 131a coupling or fixing one end of the tether 130 to the rear part of the airbag cushion 120 and a front part 131b coupling or fixing the other end of the tether 130 to the front part of the airbag cushion 120. Regarding the operation of the airbag module 100 having the above structure, when the driving speed of the vehicle is abruptly decreased due to head-on crash, the impact sensor detects the impact occurring in the head-on crash and generates the impact signal. At this time, the electronic control module recognizes the impact signal, so the electronic control module ignites the detonator of the inflator 110 to burn a gas generating agent of the inflator 110, so that the gas generating agent generates the N2. While moving from gas exhaust ports 111 formed in the inflator 110 to a gas injection port 121 of the airbag cushion 120, the nitrogen gas expands or deploys the airbag cushion 120 toward the passenger.

The deployed airbag cushion 120 makes contact with the passenger to partially absorb impact. In addition, when the deployed airbag cushion 120 makes contact with the head or the chest of the passenger by inertia, the N2 of the airbag cushion 120 is rapidly exhausted through gas exhaust holes of the airbag cushion 120 to attenuate the impact exerted on the front part of the passenger. Accordingly, impact power applied to the passenger in the crash of the vehicle is effectively attenuated, so that a second collision, that is, a collision between other components of the vehicle and the body of the passenger can be reduced.

However, when the tether 130 wound around the inflator is deployed by the N2 inflating the airbag cushion 120, the tether 130 may not be linearly or progressively deployed toward the passenger, but may be spirally deployed or twisted due to the increase of the friction between the inflator and the tether. If the tether 130 is spirally deployed, the tether 130 may be twisted so that the deployment length of the airbag cushion is reduced, and the impact absorbing effect of the airbag cushion is reduced at the front of the passenger due to the reduction in deployment length of the airbag cushion. Accordingly, the airbag cushion may be abnormally or inconsistently deployed.

SUMMARY OF THE INVENTION

The present invention has been made to solve the above problem occurring in the prior art, and an object of the present invention is to provide a passenger airbag cushion of a vehicle, in which a tether includes a tether holder for securing a tether such that the tether can be inhibited or prevented from being twisted due to friction between the tether and an inflator when the tether is deployed, to allow the tether to be secured and sequentially deployed.

Another object of the present invention is to provide a passenger airbag cushion of a vehicle, capable of increasing frictional resistance on a surface of a tether, which makes contact with the tether holder, and reducing frictional resistance on a surface of the tether, which does not make contact with the tether holder, thereby allowing the tether, which is folded and restrained in the tether holder, to be sequentially deployed.

Another object of the present invention is to provide a passenger airbag cushion of a vehicle, in which the twist prevention structure includes a fixing part that secures the tether to a tether holder unless pressure exceeds a predetermined level.

According to the present invention as described above, the tether can be prevented from being folded or twisted while being shaken during deployment and inflation of the airbag cushion, and the airbag cushion can be exactly deployed and inflated by preventing deployment length of the tether from being reduced due to twist and folding. Further, the airbag cushion is exactly deployed and inflated toward a passenger, so that an impact applied to the passenger can be attenuated.

In order to accomplish the above object, according to one aspect of the present invention, there is provided a passenger airbag cushion including a tether wound around an inflator installed in a dashboard of a passenger seat of a vehicle while being connected with both ends of an inner surface of an airbag cushion, and restraining the airbag cushion deployed and inflated by gas generated from the inflator, and a tether holder allowing the tether to be folded in a direction opposite to a deployment direction of the tether, which is deployed by the inflator, and restraining the tether such that the tether is secured to the tether holder.

Described herein is an airbag module including an inflator for generating a gas, an airbag cushion adapted to be inflated, a tether coupled to the airbag cushion and comprising a section formed of a fabric material, and a tether holder adapted to contain the section prior to inflation and prevent twisting of the tether during deployment of the tether when the airbag cushion is inflated. The tether may be fixed to the tether holder by sewing or bonding and adapted to release upon application of a force during deployment or may be fixed to the tether holder by stitching that is adapted to break during deployment. The tether may also be partially folded in a direction opposite to a deployment direction of the airbag cushion. The tether may also include a frictional resistance reduction portion that is adapted to reduce frictional resistance between the tether and the tether holder during deployment and the frictional resistance reduction portion may be an opening or recessed area. The tether may also include a frictional resistance increase portion that may be adapted to contact the tether holder to increase friction therebetween during deployment. The frictional resistance increase portion may be a coating having predetermined thickness such that the thickness of the tether is increased or be formed of a layer of the fabric material affixed to the tether that may be fixed to the tether through sewing or bonding.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The above and other objects, features and other advantages of the present invention will be more clearly understood from the following detailed description when taken in conjunction with the accompanying drawings, in which.

DETAILED DESCRIPTION OF INVENTION

Figure 3:
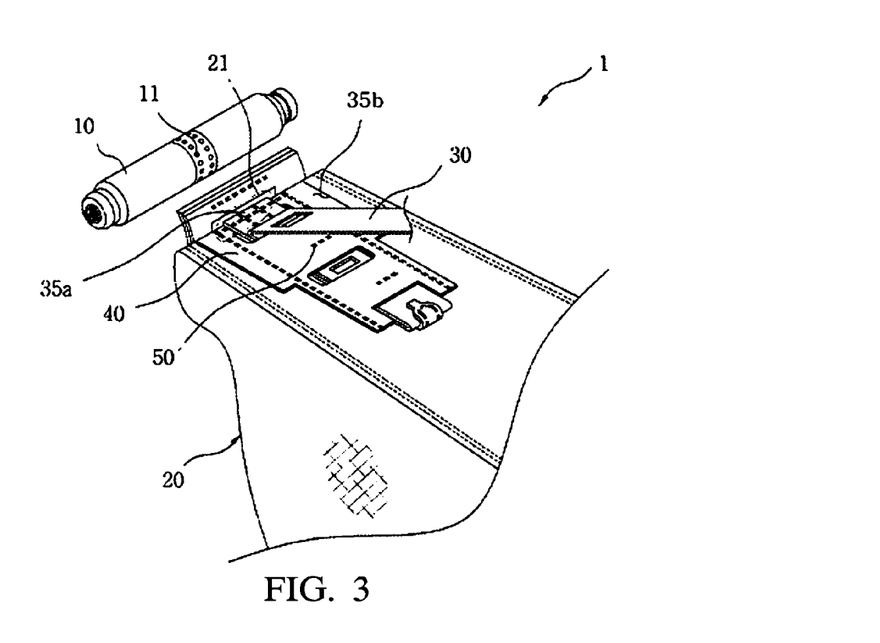
FIG. 3 is a perspective view schematically illustrating a deployment shape of a passenger airbag cushion equipped with a tether holder used in a vehicle according to the present invention.

Hereinafter, an embodiment according to the present invention will be described in detail with reference to the accompanying drawings. FIG. 3 is a perspective view schematically illustrating a deployment shape of a passenger airbag cushion equipped with a tether holder according to the present invention, and FIGS. 4A to 4D are views schematically illustrating a tether of the passenger airbag cushion equipped with the tether holder according to the present invention. The tether is coupled to the airbag cushion and includes a section formed of a fabric material. The tether holder is adapted to contain the section prior to inflation and prevent or inhibit twisting of the tether during deployment of the tether when the airbag cushion is inflated. The tether may be fixed to the tether holder by sewing or bonding. The tether holder is adapted to release the tether upon application of a sufficient force to the tether during deployment. The tether may be fixed to the tether holder by stitching or adhesive that is adapted to break when the airbag cushion is inflated during deployment.

Referring to FIG. 3, the passenger airbag module 1 according to the present invention is installed at an upper inner portion of a front surface of an instrument panel provided opposite to a passenger seat.

In this regard, the passenger airbag module 1 includes an inflator 10 that generates a gas such as nitrogen (N2), an airbag cushion 20 deployed and inflated by the N2, and a tether 30 properly maintaining the deployment shape and length of the airbag cushion 20.

The inflator 10 is designed such that the detonator thereof is ignited according to an impact signal for impact energy detected by the impact sensor. In addition, the inflator 10 has a gas generating agent used to generate the N2, and injects into the airbag cushion 20 through gas exhaust ports 11 formed at the center portion of the inflator 10.

The airbag cushion 20 includes a front part 131b having a size sufficient to make contact with the head and the chest of the passenger such that the head and the chest of the passenger can be protected from impact in vehicle crash. The airbag cushion 20 includes a rear part 35a provided with a gas injection port 21 receiving the N2 that has been exhausted from the gas exhaust ports 11 of the inflator 10.

The airbag cushion 20 includes the tether 30, which connects the front part 131b of the airbag cushion 20 making contact with the body of the passenger with the rear part 35a of the airbag cushion 20 receiving the N2 from the inflator 10 inside the airbag cushion 20, such that the deployment length and shape of the airbag cushion 20 can be properly maintained. The tether 30 includes a first end coupled or fixed to the rear part 35a of the airbag cushion 20 through sewing, and a second end coupled or fixed to the front part 131b of the airbag cushion 20 through sewing.

The tether 20 may be wound around the inflator 10 and installed in the airbag cushion 20. It is desirable that the tether 20 may be freely bent or folded, and serve as a partition plate including a material the same as or different from that of the airbag cushion 20. The tether 30 is secured by a tether holder 40 provided at an inner surface of the airbag cushion 20 before the tether 30 is inflated or deployed by the gas. The tether holder 40 has a rail shape and is attached or fixed to the inner surface of the airbag cushion 20 to allow the tether 30 to be sequentially deployed.

The tether 30 has a predetermined length and is folded in the tether holder 40 in the direction opposite to the deployment direction of the airbag cushion 20. The tether 30 is formed with frictional resistance reduction parts 31 to reduce a frictional area. The frictional resistance reduction portion may an opening through the tether or recessed area.

Figure 4A:
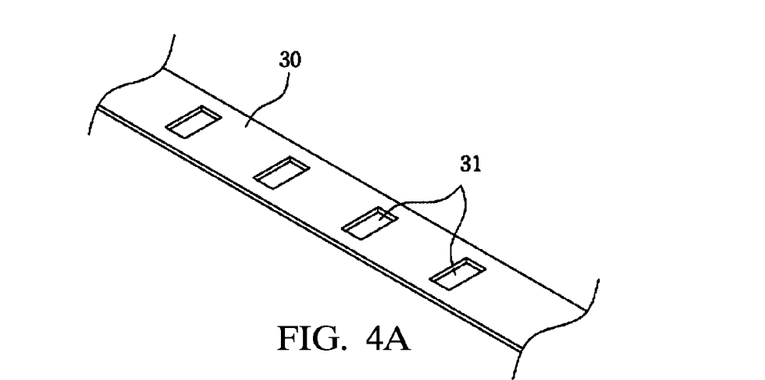
FIGS. 4A to 4D are views schematically illustrating various tethers of a passenger airbag cushion equipped with a tether holder used in a vehicle according to the present invention.
Figure 4B:
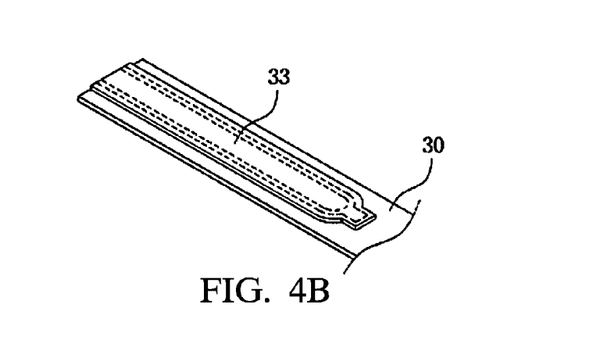
Figure 4C:
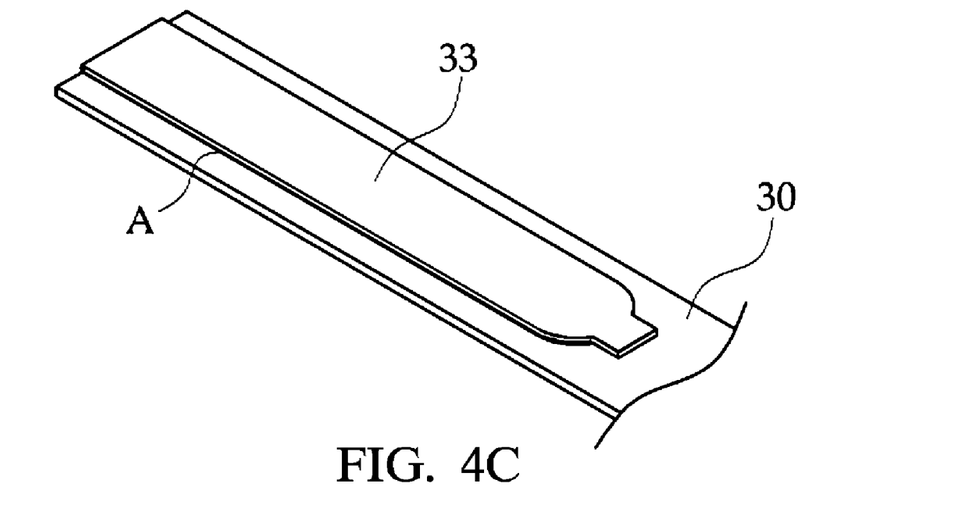
Figure 4D:
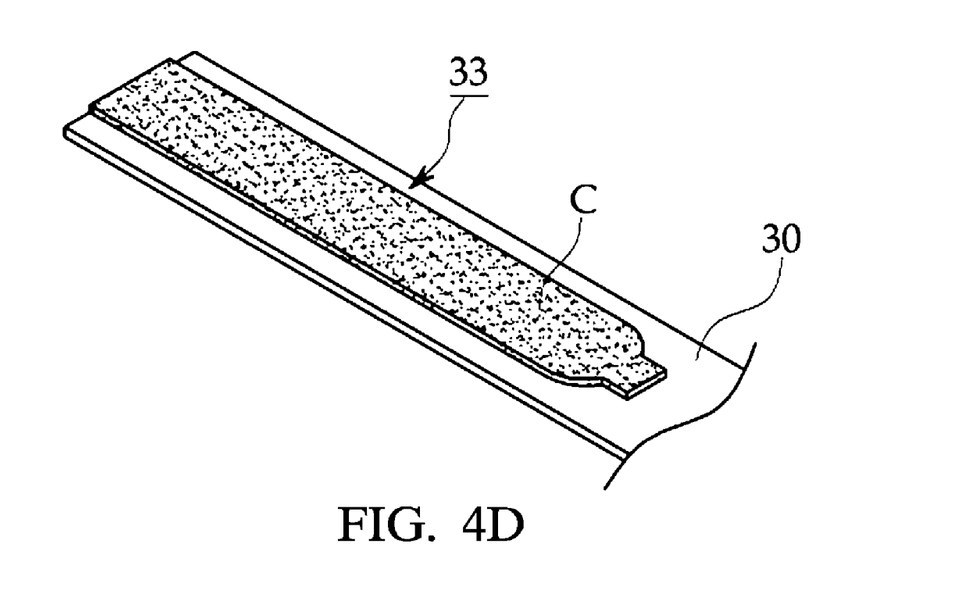

FIG. 4A shows the frictional resistance reduction parts and FIGS. 4B to 4D show a frictional resistance increase part. The frictional resistance reduction parts 31 are formed by partially or completely removing a surface area of the tether 30 to reduce the total area of the tether 30 without changing the external size of the tether 30.

The frictional resistance increase part 33 is formed on a part of the tether 30, at which the tether 30 makes contact with the inner surface of the airbag cushion 20, to increase friction when the tether 30 is deployed so that the tether 30 is deployed after the frictional resistance reduction parts 31 are deployed. The frictional resistance increase part 33 increases the thickness of the tether 30. In particular, the frictional resistance increase part 33 has a predetermined length and is installed along the longitudinal center of the tether 30 in the deployment direction of the tether 30. The frictional resistance increase part 33 may include material identical to that of the tether 30. The frictional resistance increase part 33 may include various materials capable of enhancing frictional force with the airbag cushion 20.

In addition, the frictional resistance reduction parts 31 and the frictional resistance increase part 33 are formed at the tether 30 such that the frictional resistance reduction parts 31 and the frictional resistance increase part 33 do not overlap each other. Preferably, the total length of the frictional resistance reduction parts 31 formed in the tether 30 and the length of the frictional resistance increase part 33 formed on the tether 30 are identical to the length of the tether holder 40. In particular, the length of the tether 30 including the frictional resistance reduction parts 31 is substantially identical to the length of the rail-type tether holder 40, and the length of the frictional resistance increase part 33 is substantially identical to the length of the rail-type tether holder 40, so the frictional resistance reduction parts 31 are folded while facing the frictional resistance increase part 33, and are inserted into the tether holder 40.

Referring to FIGS. 4B and 4C, the frictional resistance increase part 33 may be attached or fixed to the tether 30 through sewing or bonded to the tether 30 using an adhesive. As shown in FIG. 4D, the frictional resistance increase part 33 may be formed by coating the longitudinal center of the tether 30 with coating material C such that frictional force of the longitudinal center of the tether 30 is increased. After the frictional resistance increase part 33 and the frictional resistance reduction parts 31 of the tether 30 are folded and restrained by the tether holder 40, a fixing part 50 is provided to secure the tether holder 40 together with the frictional resistance increase part 33 and the frictional resistance reduction parts 31.

The fixing part 50 is destroyed when the fixing part 50 is subject to predetermined force. Preferably, the fixing part 50 may be coupled with the tether holder 40 through sewing, or bonding. Various structures can be used for the fixing part 50 when the fixing part 50 can release or break or be destroyed by a force generated by the pressure of gas generated from the inflator 10.

Figure 5A:
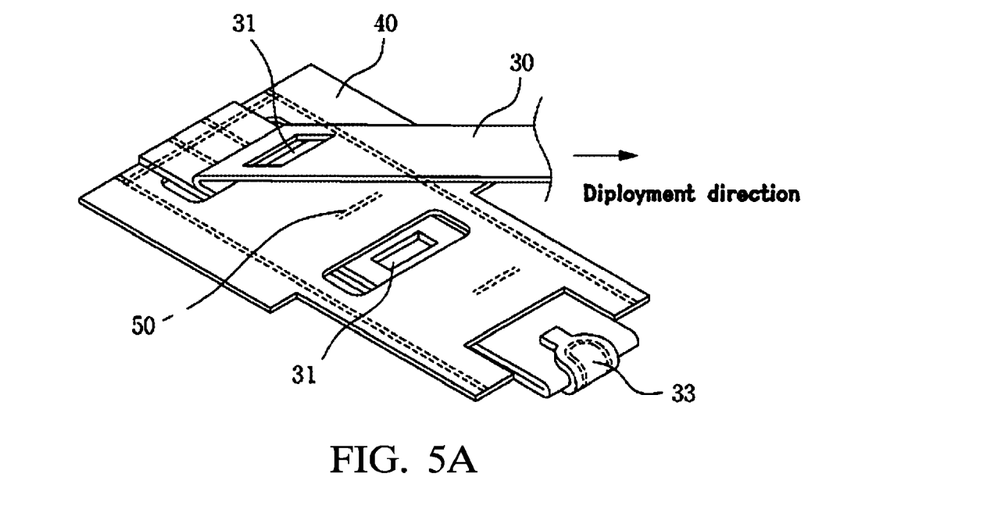
FIG. 5A is a perspective view showing a tether which is not deployed from a tether holder in a passenger airbag cushion equipped with a tether holder used in a vehicle according to the present invention.
Figure 5B:
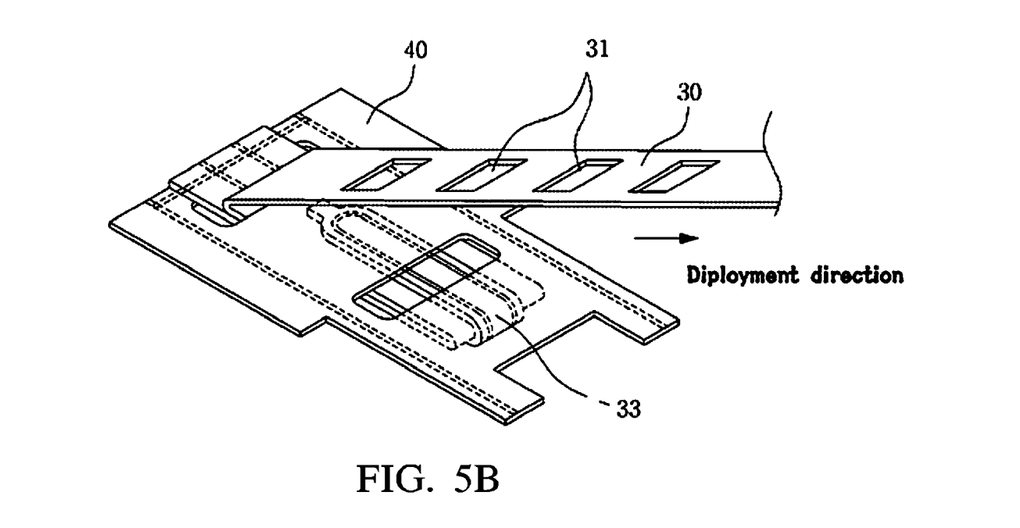
FIG. 5B is a perspective view showing a tether which is partially deployed from a tether holder in a passenger airbag cushion equipped with a tether holder used in a vehicle according to the present invention.

FIGS. 5A and 5B are perspective views schematically showing the tether holder and the tether according to a deployment process of the passenger airbag cushion equipped with the tether holder according to the present invention. Referring to FIG. 5A, the gas is exhausted from the inflator 10 to form predetermined gas pressure, so the tether holder 40 is destroyed. When the fixing part 50 is destroyed and the airbag cushion 20 is deployed toward the front part 131b, the tether 30 is withdrawn from the tether holder 40 to restrain the deployment length of the airbag cushion 20. At this time, since the opposite end of the tether 30 is connected with the front part 131b, when the front part 131b is deployed toward a front part of the passenger, the frictional resistance reduction parts 31 of the tether 30, which have been folded in the tether holder 40, is withdrawn prior to the frictional resistance increase part 33 with the deployment of the end of the tether 30.

After the frictional resistance reduction parts 31 is withdrawn toward the rear part 35a, since the tether 30 having the frictional resistance reduction parts 31 pulls the frictional resistance increase part 33, the frictional resistance increase part 33 is withdrawn toward the front part 131b. At this time, the tether holder 40 supports the tether 30 such that the tether 30 is sequentially deployed and simultaneously secures the tether 30 to the inner surface of the airbag cushion 20.

Figure 6:
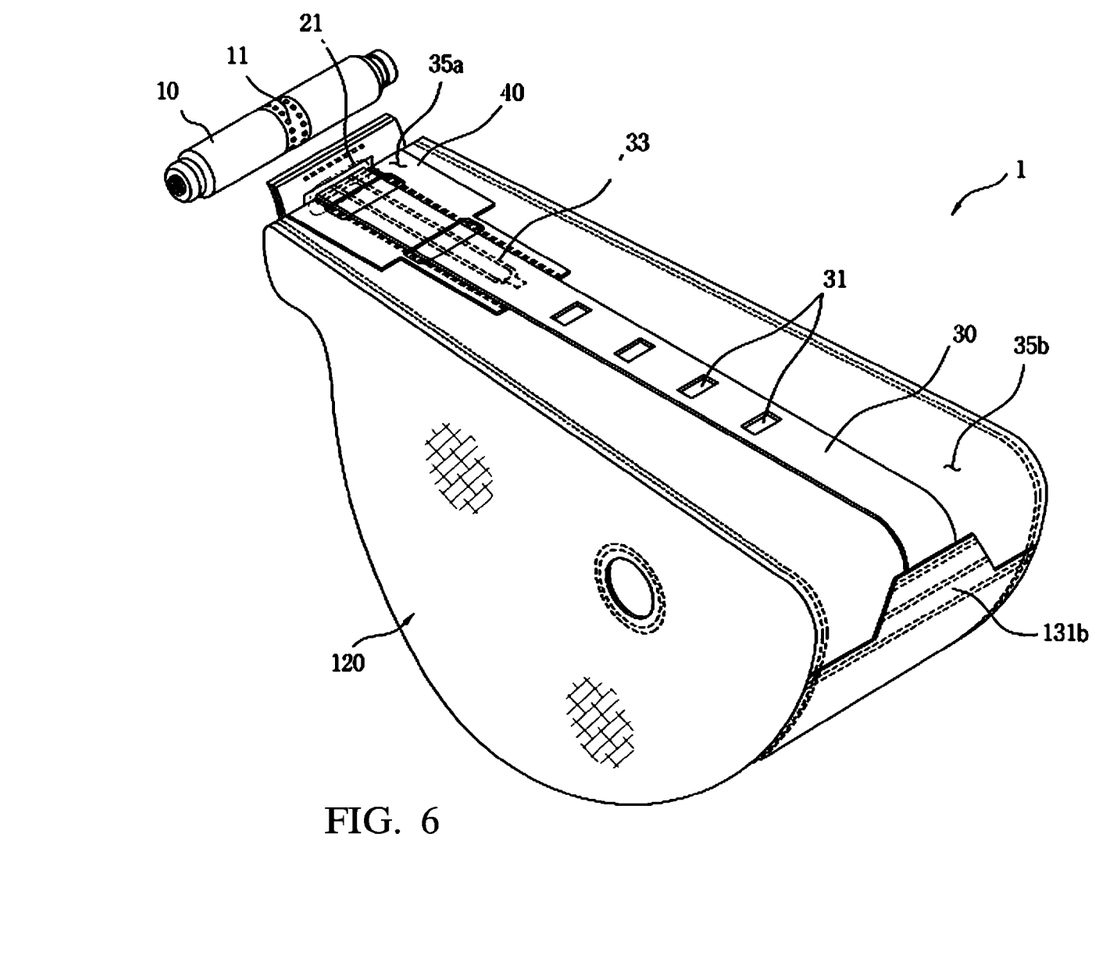
FIG. 6 is a perspective views schematically showing a deployment shape of a passenger airbag cushion equipped with a tether holder according to the present invention.

FIG. 6 is a perspective views schematically showing the deployment shape of the passenger airbag cushion equipped with the tether holder according to the present invention. Referring to FIG. 6, the tether 30 is released from the tether holder 40 in such a manner that the frictional resistance reduction parts 31 having relatively low friction are primarily withdrawn while being induced by a part connected to the front part 131b, and the frictional resistance increase part 33 connected with the frictional resistance reduction parts 31 is secondarily withdrawn. In such a case, since the end of the tether 30 is connected with the rear part 35a, the airbag cushion 20 is deployed corresponding to the length of the tether 30 while being coupled or fixed to both ends of the tether 30.

Figure 7:
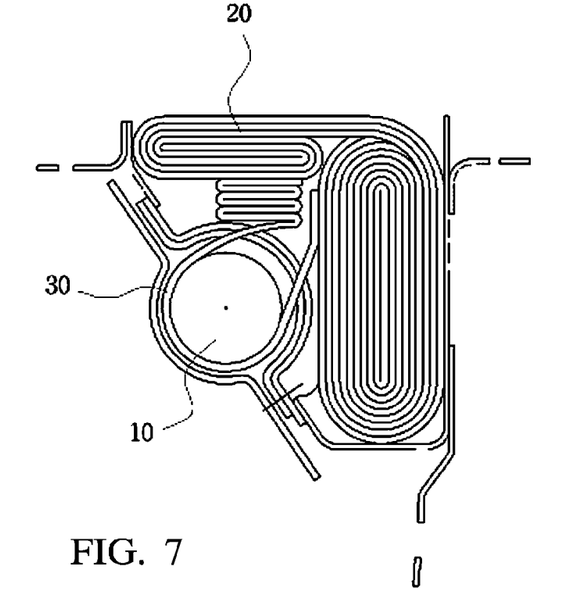
FIG. 7 is a perspective view showing a folded shape of an airbag cushion and a tether according to an embodiment of the present invention.

FIG. 7 is a perspective view showing a folded shape of the airbag cushion and the tether according to an embodiment of the present invention. Referring to FIG. 7, the tether 30 that properly maintains the deployment length of the airbag cushion 20 is coupled or fixed to the inflator 10 while surrounding the inflator 10. The tether 30 surrounds the outer surface of the inflator 10 installed at the outer surface of one side of an airbag housing, and both ends of the tether 30 are coupled or fixed to the inner part of the airbag cushion 20 through sewing or bonding. The airbag cushion 20 is folded and accommodated in the airbag housing provided in the instrument panel of a passenger seat of a vehicle. In particular, the airbag cushion 20 includes a first part that is folded in parallel to an upper part of the inflator 10 and a second part that is folded in parallel to a side part of the inflator 10.

Figure 8A:
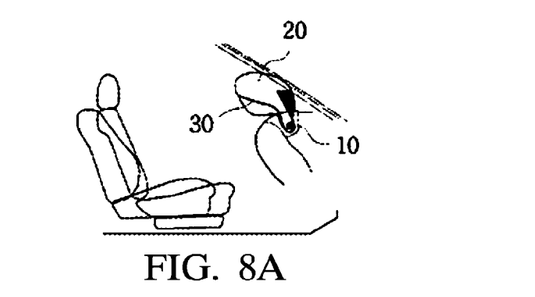
FIGS. 8A to 8F are views showing a deployment process of an airbag cushion according to an embodiment of the present invention.
Figure 8B:
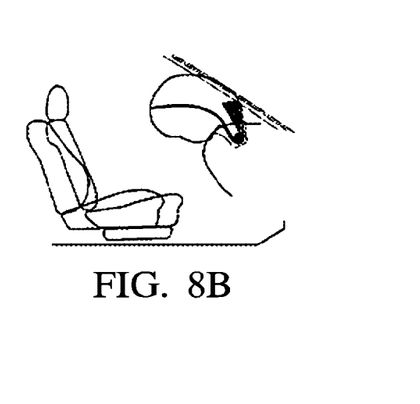
Figure 8C:
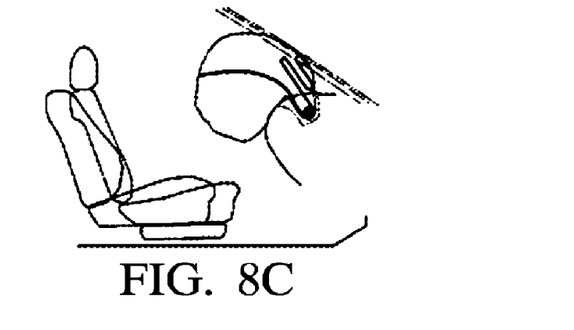
Figure 8D:
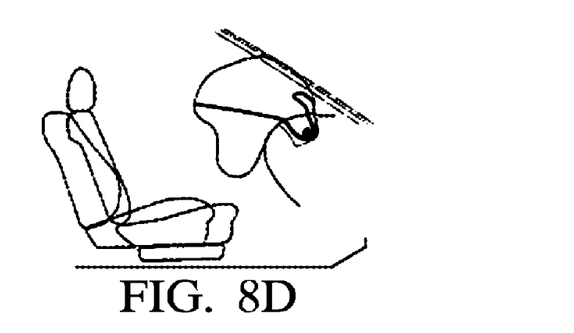
Figure 8E:
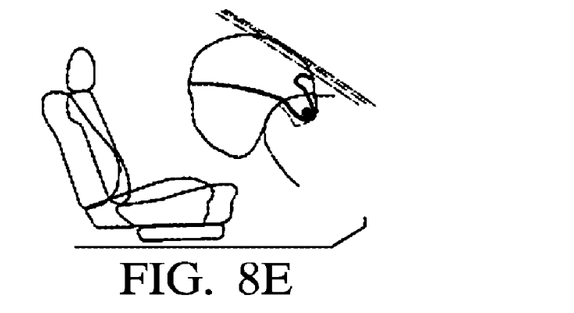
Figure 8F:
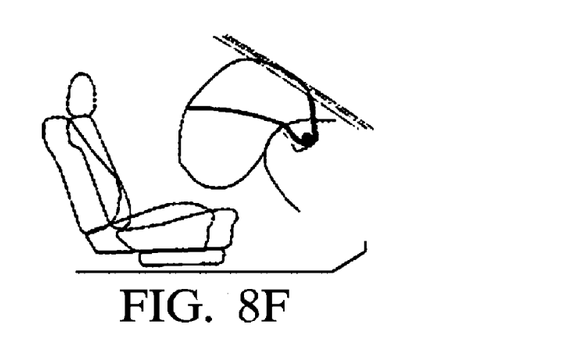

FIGS. 8A to 8F are views showing the deployment process of the airbag cushion according to the embodiment of the present invention. Referring to FIGS. 8A to 8F, when a predetermined impact is applied to the vehicle, the airbag system operates. First, as the gas exhausted from the inflator 10 is injected into the airbag cushion 20, the airbag cushion 20 is inflated toward the passenger. At this time, the tether 30 properly maintains the deployment length of the airbag cushion 20, and the airbag cushion 20 is deployed toward the passenger corresponding to the length of the tether 30, so that the impact applied to the passenger can be attenuated. Referring to FIG. 8A that shows an initial inflation process of the airbag cushion 20, the airbag cushion 20 is deployed upward to make contact with a windshield. As shown FIG. 8B, the airbag cushion 20 is inflated toward the passenger and is simultaneously deployed toward the lower part of the body of the passenger along the outer surface of the instrument panel.

The speed of the airbag cushion 20 deployed toward the passenger can be decreased according to the folded shape of the tether 30. As shown FIG. 8C, since the tether 30 is folded in a location adjacent to the windshield, the deployment speed of the airbag cushion 20 can be reduced corresponding to the release speed of the tether 30. Thus, the speed of the airbag cushion 20 deployed toward the passenger is reduced, so that the passenger can be protected from being injured due to the airbag cushion 20. Simultaneously, load applied to the windshield is distributed, so that the windshield can be prevented from being damaged.

Although few embodiments of the present invention have been shown and described, it would be appreciated by those skilled in the art that changes may be made in these embodiments without departing from the principles and sprit of the invention, the scope of which is defined in the claims and their equivalents. While this invention has been described in terms of the preferred embodiments thereof, it is not intended to be so limited, but rather only to the extent set forth in the claims that follow.

I claim:

1. An airbag module comprising:
   an inflator for generating a gas;
   an airbag cushion adapted to be inflated;
   a tether coupled to the airbag cushion at both ends and comprising a section formed of a fabric material the section formed of fabric material additionally having an increased friction portion attached thereto; and
   a tether holder adapted to contain the section prior to inflation and inhibit twisting of the tether during deployment of the tether when the airbag cushion is inflated; and
   wherein the tether holder is coupled to an inner surface of the airbag cushion to allow the tether to be sequentially deployed, and wherein the tether holder is provided on a part of the airbag cushion such that the increased friction portion makes contact with the inner surface of the airbag cushion to increase friction between the tether, the tether holder and the inner surface of the airbag cushion during deployment.

2. An airbag module according to claim 1, wherein the tether is fixed to the tether holder by sewing and adapted to release upon application of a force during deployment.

3. An airbag module according to claim 2, wherein the tether is fixed to the tether holder by stitching that is adapted to break during deployment.

4. An airbag module according to claim 1, wherein a portion of the tether is folded in a direction opposite to a deployment direction of the airbag cushion.

5. An airbag module according to claim 1, wherein the section formed of fabric material includes a reduced friction portion that is adapted to reduce frictional resistance between the tether and the tether holder during deployment.

6. An airbag module according to claim 5, wherein the reduced friction portion comprises an opening or recessed area.

7. An airbag module according to claim 1, wherein the increased friction portion comprises a coating having predetermined thickness such that the thickness of the tether is increased.

8. An airbag module according to claim 1, wherein the increased friction portion is a layer of fabric material affixed to the tether.

9. An airbag module according to claim 8, wherein the increased friction portion is fixed to the tether through sewing or bonding.

10. An airbag module according to claim 1, wherein the tether is fixed to the tether holder by bonding and adapted to release upon application of a force during deployment.

* * * * *